Patented Jan. 15, 1952

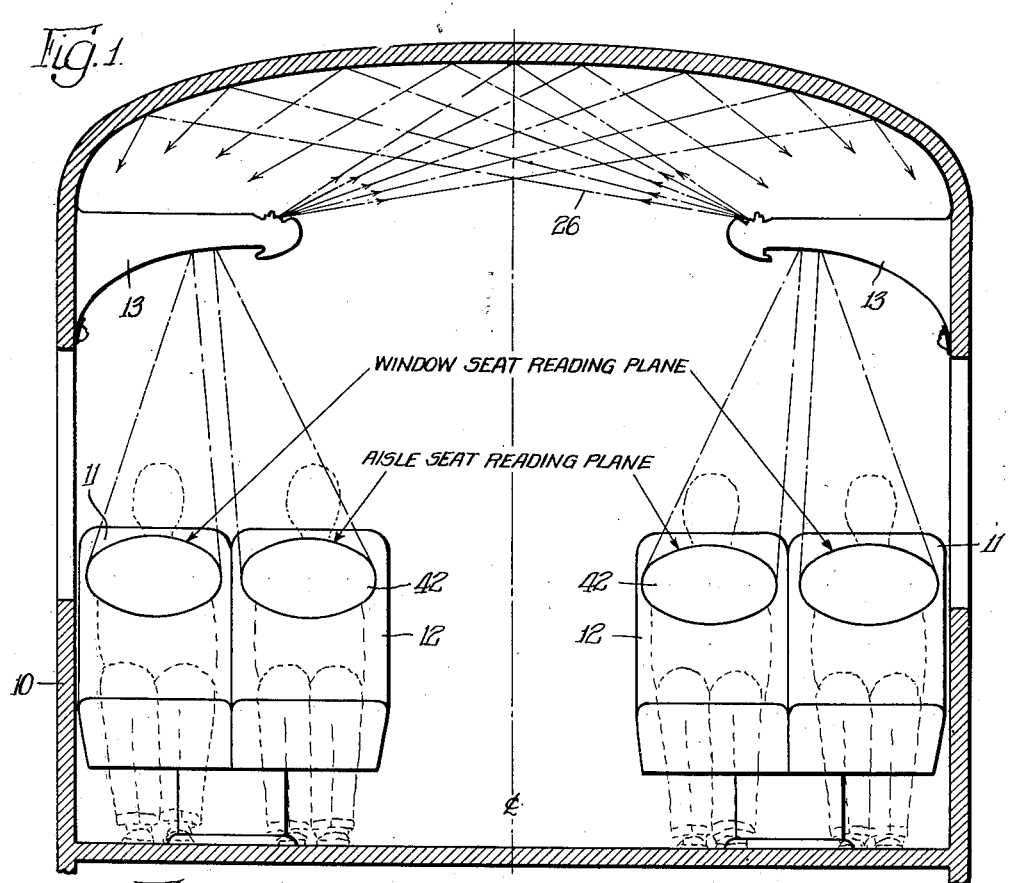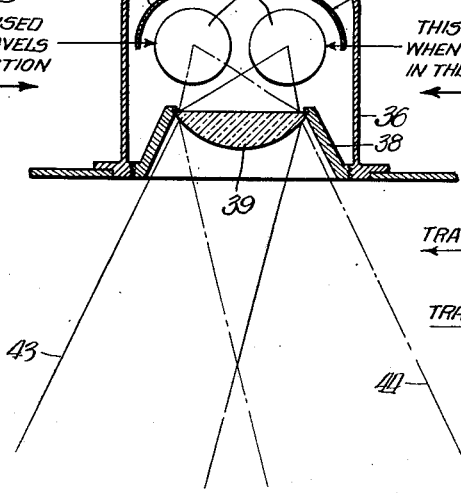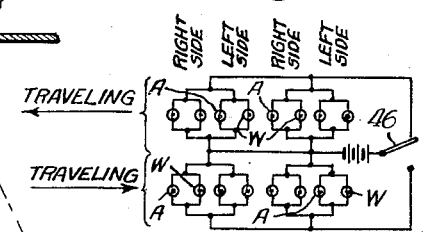

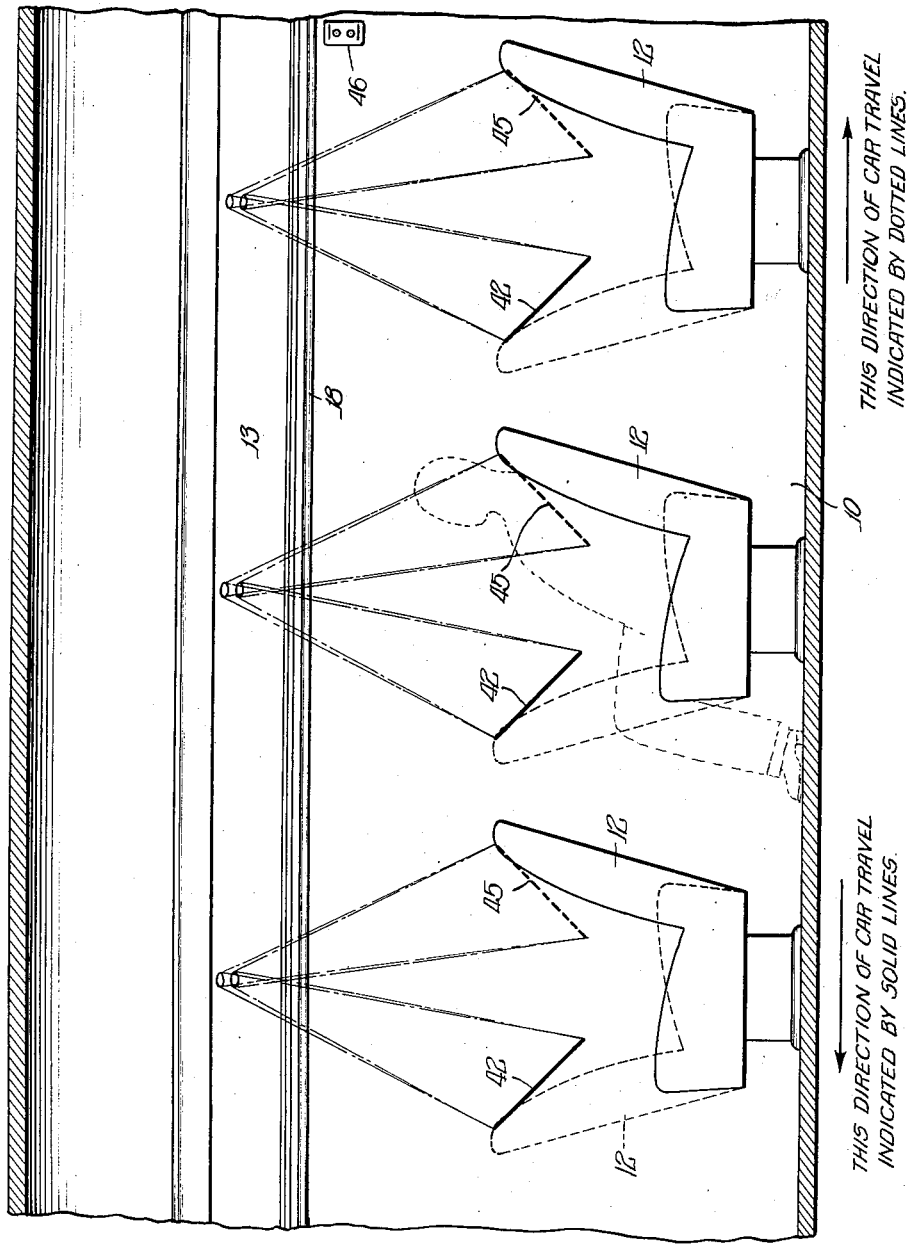

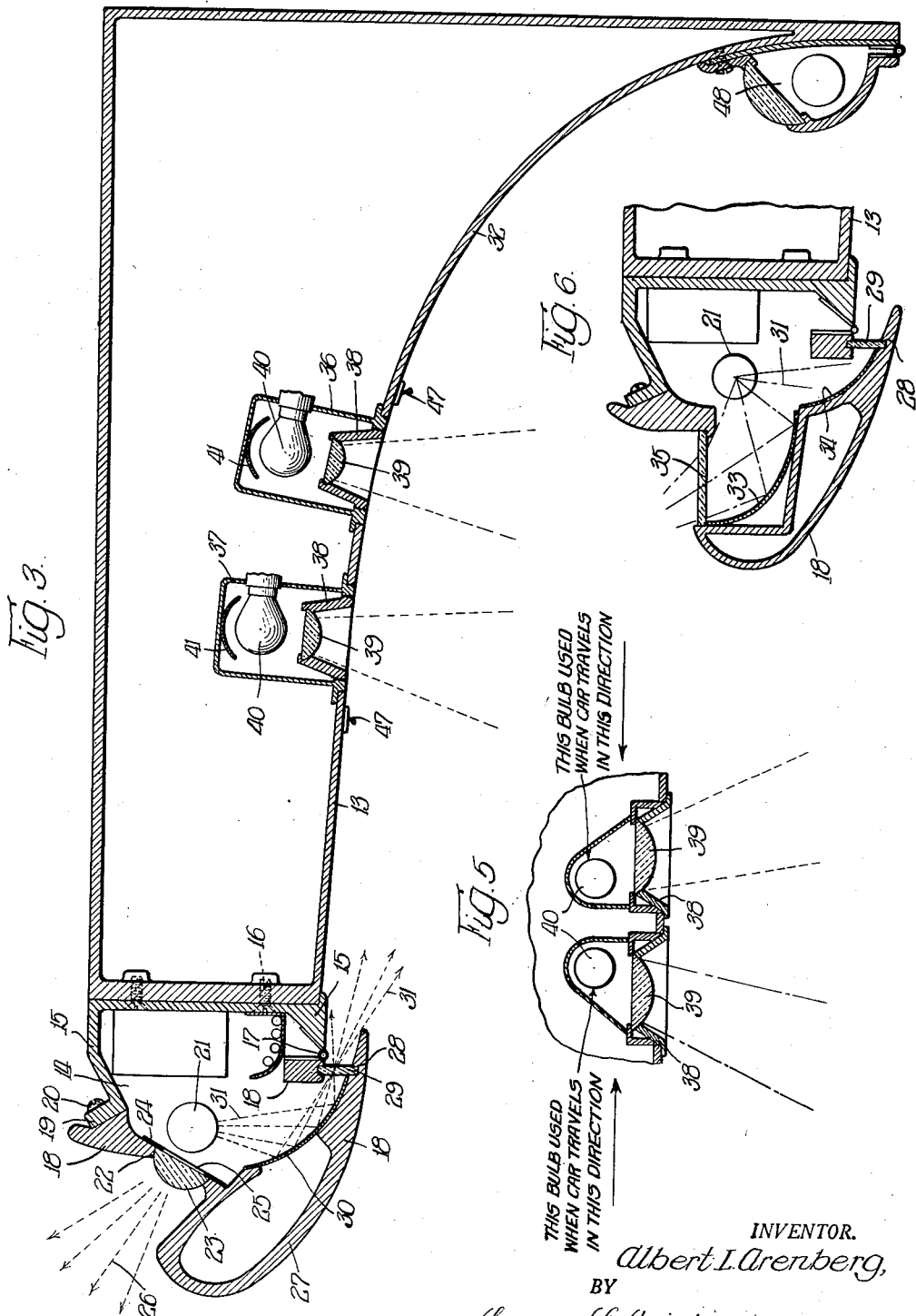

2,582,738

UNITED STATES PATENT OFFICE 2,582,738

INTERIOR ILLUMINATION SYSTEM FOR VEHICLES AND RECESSED TWIN BEAM FIXTURES THEREFOR

Albert L. Arenberg, Highland Park, Ill., assignor to Patent License Corporation, Chicago, Ill., a corporation of Illinois Continuation of application Serial No. 563,171, November 13, 1944. This application July 8, 1949, Serial No. 103,705

5 Claims. (Cl. 240—7.35)

This application is a continuation of my copending application Serial No. 563,171, filed November 13, 1944, which is abandoned.

The present invention relates to an illuminating system, and requisite fixtures involved therein, particularly designed for fully illuminating the interior of a railway car or similar passenger conveyance. It includes provision for uniformly and thoroughly illuminating the interior of the vehicle, in part by a scheme of indirect lighting wherein the presence of shadows or images of the illumination source is avoided and in part by direct intensified beams onto the reading area or plane of passengers occupying seats in the vehicle.

As a further feature I contemplate improvements in the last named direct lighting feature whereby, in the case of a vehicle having reversible seats or individual chairs adjustable with relation to the direction of travel, the passenger's reading area is fully and perfectly illuminated regardless of the direction of travel of the vehicle and the consequent disposition of his seat relative to the vehicle. In this respect the invention is also particularly intended for application to standard railway coach vehicles having pairs of seats on either side of a center aisle.

An object of the invention is to provide an indirect lighting system for a vehicle of the type described, preferably associated with the usual overhead luggage rack of the vehicle, such as is commonly disposed on either side of an aisle and extends longitudinally thereof, whereby the ceiling and upper portion of the vehicle interior are fully illuminated without shadow and, moreover, without reproduction of an image of the light source thereon.

A further object is to provide a system of the type described having provisions for illuminating the ceiling, as described, and in association therewith provisions for fully and uniformly illuminating the area immediately beneath the luggage rack by indirect light.

Yet another object is to provide a system of the type referred to in which said provisions for illuminating the area immediately beneath said luggage rack or equivalent support, are retracted or withdrawn with relation to the exposed surface of such rack or support, whereby to provide an improved continuity of surface appearance of the installation and to eliminate projecting parts likely to be damaged by impact or to cause injury to a person inadvertently bumping into the same.

Another more specific object is to provide a system of the sort referred to in the preceding paragraph, in which the illuminating provisions include light housing means having a light source or sources therein, in association with appropriate lens means for directing beams downwardly onto a reading area beneath said housing means, and in which said lens means is supported in an improved, retracted fashion relative to the exposed surface of a luggage rack or other support for the housing structure by means of generally tubular, conical lens mounting means associated with said housing and extending inwardly thereof.

A further object is to provide a system of the type described above, wherein a single light source is employed for both fields of illumination described.

A still further object of the invention is to provide a system of the type described which is characterized by its simplicity and economy of structure and efficiency of operation.

A further object of the invention is to provide individual illumination means associated with the luggage rack or similar support on a vehicle for directing intensified twin reading beams downwardly to adjacent passenger seats on one side of the center aisle whereby each occupant is afforded an individual intensified illuminated area at his reading plane; and furthermore, wherein provisions are made for assuring such individual illuminated reading area regardless of the direction of travel of the vehicle and the attendant orientation of the reversible seats of the latter, the arrangement being such that said illuminating provisions are entirely concealed with regard to the exposed surface of said support.

Yet another object of the invention resides in the provision with individual twin reading lights of the type described along with electrical wiring circuits therefor, of a master switch whereby simultaneous adjustment is made by the operator or conductor of the vehicle to bring into operation the appropriate light source for producing the appropriate beam indicated by the direction of travel of the vehicle.

Other and further objects of the invention will be pointed out or indicated hereinafter or will be apparent upon an understanding of the invention or upon actual use of it.

For the purpose of aiding in an explanation of the invention I show in the accompanying drawing, forming a part of this specification, preferred forms in which it may be embodied. It will be understood, however, that this disclosure is presented merely for purpose of illustration and is not to be regarded as imposing unnecessary limitations on the appended claims, which are intended to define the invention.

In the drawings,

Fig. 1 is a diagrammatic view in transverse section through a passenger vehicle of the type described, illustrating generally the lighting system herein provided and the several interior illumination and reading beams contemplated by the present invention, also the relation of the latter to the reading areas or planes of passengers;

Fig. 2 is a fragmentary view in vertical longitudinal section through the vehicle further illustrating the selectively available intensified reading beams, which are made operative in accordance with the direction of travel of the vehicle;

Fig. 3 is a view in transverse vertical section through a luggage rack of a vehicle, with which the provisions of this invention are primarily intended to be associated, further illustrating details of construction and arrangement of the several features of the invention, particularly the provisions for withdrawing the illumination structure relative to the exposed surface of its support;

Fig. 4 is a fragmentary view in longitudinal vertical section through an illumination housing of the present system and illustrates the means for producing at will selective longitudinally divergent intensified beams produced under the control of a master switch, in accordance with the direction of travel of the vehicle;

Fig. 5 is a fragmentary view in longitudinal vertical section through the illumination housing means of the system in a slightly modified embodiment thereof, similarly indicating the longitudinally spaced and longitudinally divergent reading beams generated selectively under the control of the master switch referred to;

Fig. 6 is a fragmentary view in general similar to Fig. 3, and on a corresponding section, illustrating a modified form of means for illuminating the vehicle interior by indirect rays, in particular the ceiling area and the area beneath the luggage rack; and Fig. 7 is a simple wiring diagram illustrating the circuit hook-up for a system such as that described.

This invention provides a system for efficiently and thoroughly illuminating the interior of a vehicle such as a railway car, bus and the like, as well as for providing intensified reading beams at the reading plane of passengers therein. Being particularly devised for use in a railway car having reversible seats, a feature of the invention is the provision for such beams regardless of the position of the passenger as determined by the direction of travel of the vehicle and the consequent disposition of the passenger's seat.

Referring to Fig. 1, I have illustrated a portion of a conventional railway car, designated by the reference numeral 10, which is provided with pairs of window and aisle seats 11, 12 on either side of the vertical center line of the car or coach. These may be conventional coach seats which are reversible in regard to the length of the car, as illustrated in Fig. 2, in order that the passenger may face forwardly regardless of the direction of travel of the vehicle; or may for the purpose of the invention also be regarded as individual chair car seats rotatably adjustable at the will of the occupant.

The reference numeral 13 designates an overhead luggage rack or similar carrier with which the illuminating provisions of my invention are associated by preference. However, it is to be pointed out that in the absence of such luggage rack, any suitable support or supports extending longitudinally of the vehicle in vertically spaced relation over the seats will serve the purpose of a support for the system. One of the purposes of the invention is to provide an improved arrangement for mounting of the illuminating structure carried by such rack or support in a retracted, withdrawn relation to the exposed surface thereof, in the interest of an improved appearance and increased safety of the installation.

Referring to Fig. 3, wherein details of the luggage rack support are illustrated, I provide, or adapt the exterior aisle-side surface of the rack 13 to provide, a light compartment or illumination housing 14 extending parallel to the rack longitudinally of the vehicle. To this end, a suitable upper elongated housing base 15, which may be in the form of a casting or stamping, is secured to the rack by screws 16. On the lower edge thereof the member 15 has pivoted thereto at 17 a swingable outer or cover member 18 and the outer portion of said cover is secured to a flange 19 on member 15 by means of screws, wing nuts or any similar threaded means 20. Thus members 15, 18 define interiorly thereof the illumination housing 14 in which an elongated light source 21 is disposed parallel to the length of the housing. The light source 21 is preferably a 36-inch long 30-watt tube obtained on the market, although any similar source may be substituted.

Referring to Fig. 3, it will be observed that the housing cover member 18 is provided with an opening 22 adjacent and behind the inner surface thereof. Said opening is elongated in the direction of the length of the rack and light source and faces upwardly and inwardly toward the vehicle ceiling in a manner to be further described. A transparent, transversely convex condensing lens 23 is disposed in said opening, being coextensive in length therewith, and is held in place by a sheet metal retaining plate 24 having an aperture 25 therein. Said aperture is elongated in the direction of length of the lens and defines the area of transmission in the vertically upward and inward direction of rays emanating from source 21, as indicated by dotted arrows 26. In the embodiment illustrated, the light source 21 is disposed immediately behind aperture 25 so that the transmission of rays from said source to and through lens 23 and onto the ceiling is, in the main, direct.

In Fig. 1, a feature of distinct importance in the present invention is illustrated; namely, that lens 23 and aperture 25 are so disposed that the rays or beams transmitted by the lens are confined in their impingement of the vehicle ceiling to points at least as far out laterally toward the aisle as the longitudinal center of the ceiling. This is clearly illustrated in Fig. 1, wherein it will appear that the only rays from a given source 21 on one side of the aisle which are reflected from the ceiling impinge said ceiling at points at least as far away from said source as the longitudinal ceiling center line. This overlapping and mixture of the beams 26 totally eliminates any possibility of an image of the light source on the ceiling and likewise prevents the production of any shadows. A very thorough yet pleasing illumination of the entire upper portion of the ceiling results, and, by reflection and normal dispersion of the rays directed to the ceiling, the entire aisle portion is lighted.

Referring again to Fig. 3, cover member 18 has an inner, rounded surface 27 which extends upwardly and inwardly sufficiently to cut off any direct downward glare of the beam 26 as well as shielding the lens 23 against impact. Surface 27 extends sufficiently inwardly to cover and afford a finished exterior for the illumination housing and at its inner end the cover member 18 defines a further elongated light-transmission aperture 28 for the light compartment 14 which extends parallel to the light source 21 and has the transparent light-transmission panel 29 disposed thereacross. Inwardly of said panel 29, the housing 14 is provided with a curved, polished reflector 30 of parabolic or other suitable design to receive the rays 31 emanating from source 21 and reflect the same through panel 29. It will be observed that as they issue through said window, the rays 31 serve to illuminate uniformly the lower curved surface 32 of the luggage rack. There will not be sufficient transmission of light in this manner to unduly and harshly flood the space beneath the rack; however, there is sufficient illumination to eliminate all shadows.

A slightly modified embodiment of the indirect ceiling and rack illumination feature of the invention is illustrated in Fig. 6, wherein it will be observed that the upwardly and outwardly directed rays 26 as well as the downwardly and inwardly directed rays 31 are both reflected. To this end the cover member 18 has the interior thereof provided with two suitably designed curved and polished reflecting surfaces 33, 34 which are spaced vertically and laterally relative to one another. The light source 21 in this case is disposed inwardly in a position whereby no substantial direct radiation from the source onto the ceiling or the lower surface 32 of the luggage rack is possible, the rays 26, 31 resulting solely from impingement of its beam on and reflection from surfaces 33, 34, respectively. In this embodiment it will also be noted that the lens 23 of the embodiment of Fig. 3 is dispensed with and a transparent panel 35 employed in its stead. In either of these embodiments the desired results are obtained, namely, uniform and thorough illumination of the ceiling and space beneath the same by rays 26 impinging the ceiling at points at least as far from the source as the longitudinal center line (as described in connection with the first embodiment) and a uniform, thorough illumination of the under surface 32 of the rack 13, whereby the space below the rack is lighted indirectly. All of the above effects are produced by a single simple fixture employing a single light source.

A further feature of the invention resides in the means for generating and downwardly directing onto the reading plane of two passengers occupying adjacent seats 11, 12 selective twin reading beams. For this purpose the lower surface 32 of the luggage rack is provided with openings which receive the laterally spaced illumination housings 36, 37 (see Fig. 3). These housings have inwardly extending conical supports 38 receiving plano-convex lenses 39. A suitable illumination source such as ordinary low power electric lamps 40 are disposed in each of the housings 36, 37. It will be observed by reference to Fig. 4 that there are two such lamps disposed in each housing 36 or 37 in spaced relation longitudinally of the direction of travel of the vehicle, for a purpose to be described. If desired, conventional reflectors 41 may be mounted on the inner surface of the housings to intensify the beam emanating from the lamps. In the modified form illustrated in Fig. 5, separate housings, each with its lens, are provided for the forward and rearward light sources, as distinguished from the embodiment of Fig. 4 wherein a single housing 36 or 37 houses both the forward and rearward bulb 40.

By means of the arrangements illustrated, separate intensified and laterally spaced beams are focused downwardly onto the respective reading areas or planes of occupants of seats 11 and 12, as clearly illustrated in Fig. 1.

The lamp housing structure by which this result is achieved, and the elements coacting therewith, including the light sources or lamp 40, reflectors 41 and lens means 39, are entirely retracted rearwardly of the exposed lower surface of the luggage rack or other support 13, as clearly illustrated in Figs. 1 and 4. In this connection, the conical lens mounting support 38 not only positions said lens properly for the proper directing of the condensed reading beams, one on each seat to the exclusion of the other seat, but it also functions to hold the lens rearwardly of the exposed, apertured lower surface of the rack or support 13. It provides thoroughly dustproof mounting for the lens, in addition. As a result, the interior appearance of the vehicle is not marred by the presence of various illuminating elements projecting substantially from the exposed lower surface of the luggage rack. The installation is substantially flush with said surface (see Figs. 1, 3, 4 and 5) to preserve substantial continuity of surface. Needless to say, the lens means 39 is safeguarded against damage due to impact by the foregoing lens mounting and light housing provisions. Furthermore, a possible source of injury to an occupant of the space beneath the rack is eliminated.

In the absence of other provision, it will be evident that these focused beams would be no more than 50% satisfactory in operation for a vehicle having reversible seats. For example, considering a beam 43 to be focused for maximum reading efficiency at a given plane, i. e., the plane 42 shown in solid lines in Fig. 2, corresponding to the solid line position of the seat 12 shown in that figure, that beam would become completely ineffective, and as matter of fact quite objectionable, in its lighting effect when said seat is reversed to the dotted line position illustrated in dotted lines in Fig. 2, for which the optimum reading plane 45 is prescribed, shown in dotted line.

It is for the purpose of eliminating this objection that I have provided the twin lamps 40 in each housing 36, 37, as shown in Fig. 4, or in separate housings, per Fig. 5. Being spaced from one another in the direction of travel of the vehicle, it will be evident that the rays therefrom when generated are transmitted through lens 39 in downwardly divergent beams 43, 44. Thus beam 43 will be employed to illuminate reading plane 42 when the vehicle is traveling in one direction and seat 12 disposed to face in a corresponding direction, while beam 44 will illuminate the reading plane 45, shown in dotted lines in Fig. 2, when the seat is reversed to the dotted line position.

The respective lamps 40 are in individual parallel circuits under the control of a master switch 46 which may be manipulated by the conductor or other operator of the vehicle, to enable one set of lamps to be cut in when the vehicle is traveling in one direction and the opposite set when traveling in the other, as desired. The wiring diagram for this circuit and the manner in which switch 46 controls the same is illustrated in Fig. 6.

In Fig. 2 the switch is shown as a push button arrangement wherein one button, appropriately designated by an arrow pointing in one direction, will be pressed to close a circuit for all lamps 40 which are to be brought into play for a corresponding direction of travel of the vehicle. Manipulation of the other button, which is similarly designated by an arrow facing in the opposite direction, brings the circuit for the other lamps into play. In addition to this, each individual lamp is controlled by an individual snap type socket switch 47 manipulated by the passenger, being located immediately adjacent the lamp housings on the lower surface 32 of the luggage rack. I have not considered it necessary to illustrate further the details of this switch or its relation in the wiring diagram since it is purely conventional.

By the foregoing, selective twin beams are made available to insure that regardless of the direction of travel of the vehicle and the corresponding orientation of seats 11, 12, an appropriate intensified reading beam will be focused at the appropriate reading plane for said position of the seats. This will insure comfort and satisfaction of the passengers. Individual control of the individual light for an aisle or window seat of the occupant thereof completes the arrangement from the standpoint of convenience. Continuity of surface appearance on the underside of the luggage rack 13 is preserved, lens means for the illuminating sources mounted therein is retracted within said surface by the improved lens mounting provisions, whereby to be protected against damage and an improved dust-sealing of the interior of the light housing is provided, in conjunction with the arrangement for securing seat lighting, either in the lateral sense or in regard to the direction of travel in the vertical in which the installation is made.

The reference numeral 48 in general designates a still further longitudinally extending lighting fixture arranged above the passenger's eye level along the side wall of the vehicle. This is disposed to throw an upwardly and outwardly directed beam onto the lower surface 32 of the luggage rack and to cooperate in bringing about full and effective indirect lighting of the vehicle interior. To the extent that it coacts to this end, it constitutes a part of the present invention although individual features thereof are not claimed herein.

I claim:

1. A lighting fixture for vehicles of the type described for producing adjacent selective twin lighting beams comprising an overhead support having illumination housing means associated therewith and provided with a downwardly opening light-transmission aperture, electric light sources in said housing means disposed in pairs and spaced longitudinally of the support, electric wiring means for said sources including individual circuits for all corresponding sources in said pairs and a master switch for selecting a circuit to energize either of said sets of corresponding sources, whereby beams may be generated by corresponding sources of either set as determined by the direction of travel of the vehicle, and transparent light-focusing means on said housing means over the aperture therein for directing laterally divergent intensified individual beams downwardly from the selected sources.

2. A lighting fixture for vehicles of the type described for producing adjacent selective twin lighting beams comprising an overhead support having illumination housing means associated therewith and provided with a downwardly opening light-transmission aperture, electric light sources in said housing means disposed in laterally spaced pairs, the sources in each pair being in spaced relation to one another longitudinally of the support, electric wiring means for said sources including individual circuits for all corresponding sources in said pairs and a master switch for selecting a circuit to energize either of said sets of corresponding sources, whereby separate laterally spaced beams may be generated by corresponding sources of either set as determined by the direction of travel of the vehicle, and transparent light-focusing means on said housing means over the aperture therein for directing laterally divergent intensified individual beams downwardly from the selected sources.

3. In a lighting system for installation in a vehicle characterized by a downwardly facing, apertured deck or ceiling surface of substantial area disposed above the respective reading planes of a pair of laterally spaced seats, a lighting unit secured behind the apertured portion of said surface comprising hollow light housing means mounted directly to the rear of said surface, a pair of electric light sources enclosed in said housing means and spaced laterally from one another in the direction of spacing of said seats, and tubular lens mounting means in said housing means aligned with and opening through the apertured portion of said surface, said mounting means extending a substantial distance rearwardly and well into said housing means from a forward point approximately flush with said surface, lens means supported by said mounting means adjacent the rear end thereof in substantially retracted relation to said surface, said lens means being located forwardly of said respective light sources in direct light transmissive relation thereto and with the center thereof in the respective lines between the foci of said sources and the center of said reading planes, whereby to direct separate light beams from said sources at different angles through said mounting means and onto said respective reading planes, each of said beams being substantially limited to the illumination of but one of said planes.

4. In a lighting system for installation in a vehicle characterized by a downwardly facing, apertured deck or ceiling surface of substantial area disposed above the respective reading planes of a pair of laterally spaced seats, a lighting unit secured behind the apertured portion of said surface comprising hollow light housing means mounted directly to the rear of said surface, a pair of electric light sources enclosed in said housing means and spaced laterally from one another in the direction of spacing of said seats, tubular lens mounting means in said housing means aligned with and opening through the apertured portion of said surface, said mounting means extending a substantial distance rearwardly and well into said housing means from a forward point approximately flush with said surface, lens means supported by said mounting means adjacent the rear end thereof in substantially retracted relation to said surface, said lens means being located forwardly of said respective light sources in direct light transmissive relation thereto and with the center thereof in the respective lines between the foci of said sources and the center of said reading planes, whereby to direct separate light beams from said sources at different angles through said mounting means and onto said respective reading planes, each of said beams being substantially limited to the illumination of but one of said planes, and means to energize said sources including individual, manually actuable controls therefor.

5. A lighting system in accordance with claim 3, in which said light housing means comprises a pair of individual separate housings, each enclosing a light source, and each provided with a tubular lens mounting means and a lens carried thereby.

ALBERT L. ARENBERG.

REFERENCES CITED

The following references are of record in the file of this patent:

UNITED STATES PATENTS

| Number | Name | Date |
|---|---|---|
| 1,903,087 | Benjamin et al. | Mar. 28, 1933 |
| 2,099,451 | Schepmoes | Nov. 16, 1937 |
| 2,192,019 | Schepmoes | Feb. 27, 1940 |
| 2,229,145 | Stewart | Jan. 21, 1941 |
| 2,238,847 | Dreyfuss | Apr. 15, 1941 |
| 2,251,050 | Hagerty et al. | July 29, 1941 |
| 2,264,637 | Landel | Dec. 2, 1941 |
| 2,280,881 | Arenberg | Apr. 28, 1942 |
| 2,302,092 | Arenberg | Nov. 17, 1942 |
| 2,323,697 | Zimmerman | July 6, 1943 |